United States Patent
Mese et al.

(10) Patent No.: US 10,257,363 B2
(45) Date of Patent: Apr. 9, 2019

(54) COORDINATING INPUT ON MULTIPLE LOCAL DEVICES

(71) Applicant: Lenovo (Singapore) Pte. Ltd., Singapore (SG)

(72) Inventors: John Carl Mese, Cary, NC (US); Arnold S. Weksler, Raleigh, NC (US); Nathan J. Peterson, Oxford, NC (US); Rod D. Waltermann, Rougemont, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 108 days.

(21) Appl. No.: 15/217,447

(22) Filed: Jul. 22, 2016

(65) Prior Publication Data
US 2018/0027127 A1    Jan. 25, 2018

(51) Int. Cl.
| | |
|---|---|
| *H04M 3/00* | (2006.01) |
| *H04M 11/00* | (2006.01) |
| *H04W 4/80* | (2018.01) |
| *H04L 29/08* | (2006.01) |
| *G10L 15/22* | (2006.01) |
| *H04W 88/04* | (2009.01) |

(52) U.S. Cl.
CPC .......... *H04M 11/007* (2013.01); *G10L 15/22* (2013.01); *H04L 67/125* (2013.01); *H04L 67/18* (2013.01); *H04L 67/303* (2013.01); *H04W 4/80* (2018.02); *G10L 2015/223* (2013.01); *H04W 88/04* (2013.01)

(58) Field of Classification Search
CPC ....... H04W 8/00; H04W 8/245; H04W 8/005; H04W 88/02; H04W 88/04; H04W 88/023; H04M 1/72525; H04M 1/72522; H04M 1/72523; H04M 1/7253; H04M 1/72558; H04M 1/72519; H04M 2207/12; H04M 2207/18; H04M 3/42178; H04M 2250/02; H04M 3/00; G08C 17/02
USPC .................... 455/418, 419, 420, 422.1, 563
See application file for complete search history.

(56) References Cited

U.S. PATENT DOCUMENTS

| | | | |
|---|---|---|---|
| 2016/0195856 A1* | 7/2016 | Spero .................... | G06N 5/046 700/90 |
| 2017/0025124 A1* | 1/2017 | Mixter ................... | G10L 15/32 |
| 2017/0329572 A1* | 11/2017 | Shah ...................... | G06F 3/167 |
| 2017/0343972 A1* | 11/2017 | McMickle ............ | G05B 15/02 |

* cited by examiner

*Primary Examiner* — Temica M Beamer
(74) *Attorney, Agent, or Firm* — Ference & Associates LLC

(57) ABSTRACT

One embodiment provides a method, including: receiving, at a first device, a user input; determining, at the first device, a second device is capable of responding to the user input; resolving, using a processor, a target device from among the first device and the second device; and executing, using the target device, a command in response to the user input. Other aspects are described and claimed.

20 Claims, 4 Drawing Sheets

COORDINATING INPUT ON MULTIPLE LOCAL DEVICES

BACKGROUND

Electronic devices, e.g., a media player, a smart television, a laptop or tablet computing device, a smart phone, combinations thereof, etc., herein "devices," are capable of responding to user inputs to perform actions, e.g., command actions such as playing media files. Certain devices are capable of responding to user inputs such as voice input, gesture input, or combinations thereof.

Depending on the use context, a user might provide input that is capable of being acted on by more than one device. For example, if a user is in a room with two or more media players that respond to voice commands, each of the devices is capable of detecting the user input voice command, identifying the content of the command, and selecting a command action in response to the user input.

BRIEF SUMMARY

In summary, one aspect provides a method, comprising: receiving, at a first device, a user input; determining, at the first device, a second device is capable of responding to the user input; resolving, using a processor, a target device from among the first device and the second device; and executing, using the target device, a command in response to the user input.

Another aspect provides an electronic device, comprising: an input device; an output device; a processor; and a memory device that stores instructions executable by the processor to: receive, at the input device, a user input; determine a second device is capable of responding to the user input; resolve a target device from among the electronic device and the second device; and execute a command in response to the user input.

A further aspect provides a product, comprising: a storage device that stores code, the code being executable by a processor and comprising: code that receives, at a first device, a user input; code that determines, at the first device, a second device is capable of responding to the user input; code that resolves, using a processor, a target device from among the first device and the second device; and code that executes, using the target device, a command in response to the user input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
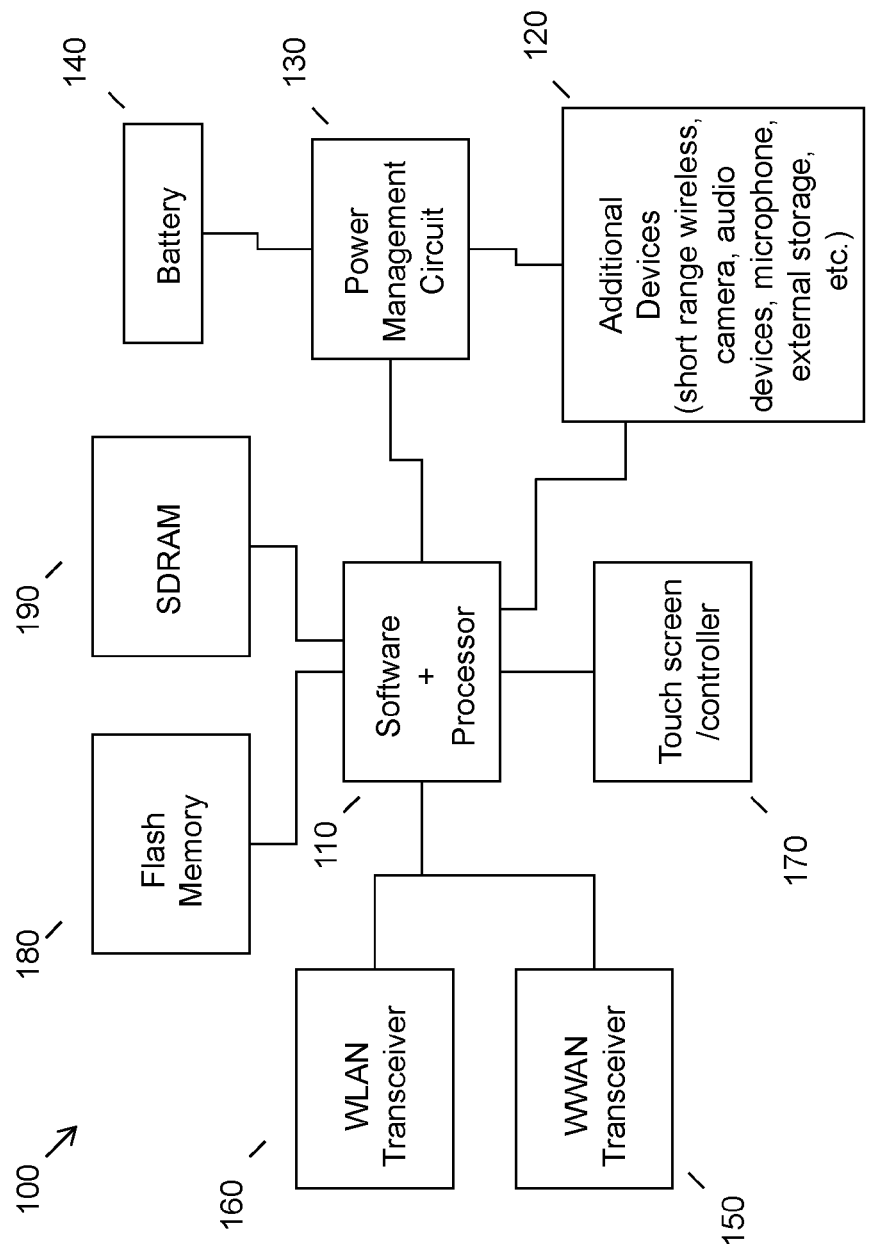
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When more than one device, e.g., in a smart home environment, is capable of receiving and acting upon voice input, it may be difficult to ensure the intended device is the one to respond. For example, if a home has two media playback devices that respond to voice input, e.g., one in the living room and one in the kitchen, a user that issues a voice command from a location where both media playback devices pick up the voice command, such voice command causes each media playback device to process and respond to the voice command. Furthermore, because of the location of the user relative to the media playback devices, each device may resolve the voice input to a different command.

In other words, conventionally devices that respond to user inputs do not coordinate with one another. Therefore, if a device receives a voice input, it will act on what it thought it heard irrespective of the presence of another such device. A user might attempt to bias this result, e.g., by walking closer to a particular device or issue a voice command in a manner that it will likely only be received by one device (e.g., modified direction and volume of voice). Further, a user might also set different wake words. However, each of these solutions complicates user operation.

Accordingly, an embodiment provides a mechanism by which multiple devices may coordinate to respond to received user input in a coherent manner. Devices are capable of determining a location and a volume of the incoming voice input when processing a command. This information may be used by an embodiment to approximate the distance a user is from a device. Moreover, as the voice input is being transcribed internally using a speech to text algorithm, a confidence factor in what the device heard is calculated. The multiple devices may then share across a network the distance and/or confidence factor determinations of each other. This permits, among other techniques, for the device with the lowest distance and highest confidence factor to be set as the target device and to act on the command.

The thresholds governing the priority of these factors (as well as others) may be learned over time, e.g., if the user has to reissue a command in order to find the right balance between distance and confidence for selecting a target device. In the event that the voice threshold does not meet the confidence level, the multiple devices that detected the user input equally (or nearly equally) may decide on one of them responding according to a policy.

The policy to resolve such conflicts may take a variety of forms. For example, the policy could be to randomly choose one of the devices as a target device. Additionally or in the alternative, the policy may include determining a target device by taking into consideration other or secondary factors, e.g., selecting a room that the user was last in, selecting a most recently used device, etc.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a microphone for receiving voice commands, a camera for receiving image data including gestures, etc. System 100 often includes a touch screen 170 for data input and display/rendering. System 100 also typically includes various memory devices, for example flash memory 180 and SDRAM 190.

Figure 2:
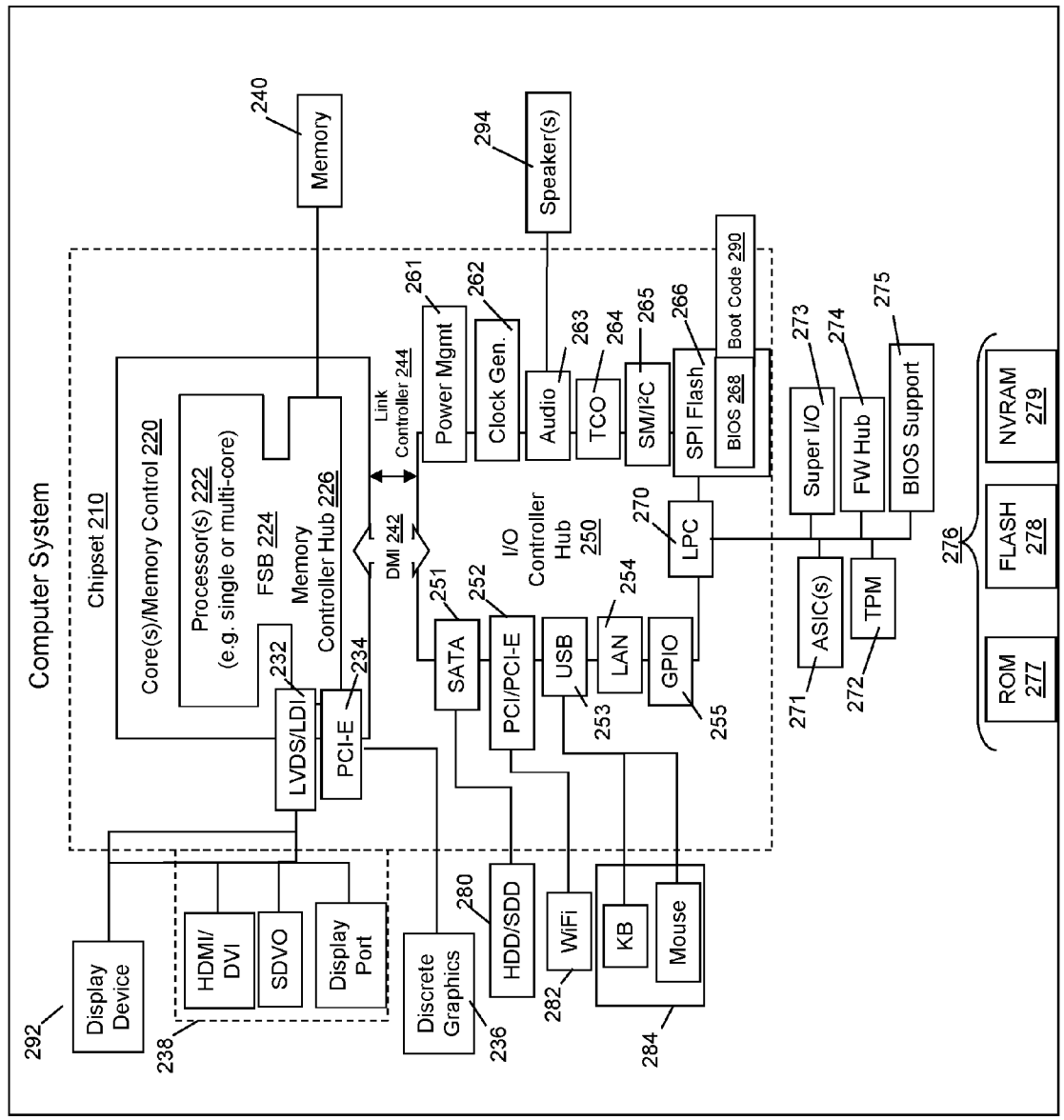
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices found in a smart home environment, such as media players, smart TVs and the like. The circuitry and components used in such devices may vary according to their purpose. For example, a device may include a microphone and speech processing circuit or program in order to receive audible user input and determine a command contained therein. Similarly, another device might include a camera and gesture processing circuit or program in order to receive gesture inputs performed by the user and match the same to command actions.

Figure 3:
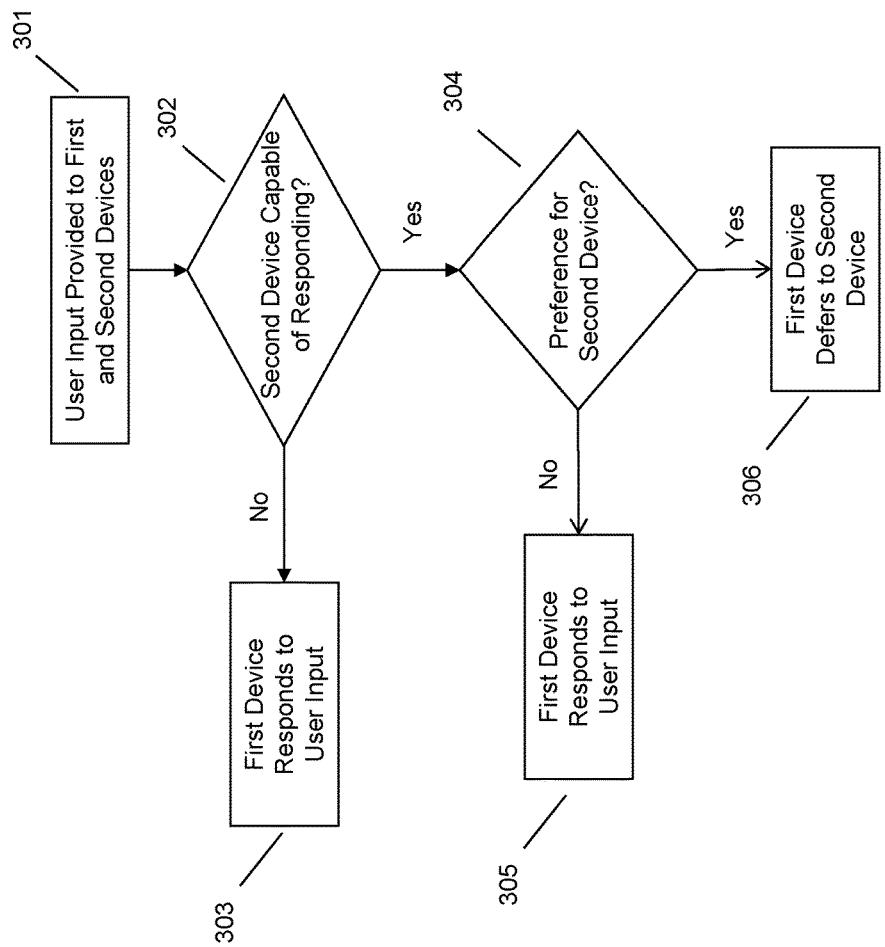
FIG. 3 illustrates an example method of coordinating input in multiple device contexts.

Referring to FIG. 3, an example method of coordinating user inputs between local devices is illustrated. An embodiment provides a mechanism to permit two (or more) devices to coordinate their responses (or lack thereof) to a user input that may be acted upon by both.

As shown in FIG. 3, a first device of a device pair used in a smart room (refer to FIG. 4) receives user input at 301. Conventionally, the first device would simply interpret the user input, e.g., convert user speech input into text and associate the text with a command action, and execute a given command. However, this might cause a conflict situation to arise, e.g., where both the first and a second device respond to a user's input, e.g., playing the same song independently (and most likely at slight different times).

As such, the first device does not immediately act to respond to the user's input. Rather, the first device determines if a second device is capable of responding to the user's input at 302. Of course this determination, as with other steps outlined in the figures, may take place in a different order, e.g., before the user input is received. This determination may be made in a variety of ways, including directly sensing and/or communicating with proximate devices, coordinating communication via a cloud or networked device, etc., as further described in connection with FIG. 4. If the first device is the only device capable of responding to the user's input, as determined at 302, the first device may act to respond thereto, as illustrated at 303.

If the first device determines, e.g., senses, is instructed, etc., that a second device is capable of responding to the user input in addition to itself, a determination is made as to whether there is a preference for the second device to respond, as illustrated at 304. The determination that there is a preference for the second device, illustrated at 304, might include determining that the second device is closer to the user than the first device, determining that the second device has identified the user input with a higher degree of confidence, determining that the user has a preference for the second device, e.g., given the current user input (e.g., type of input) or past inputs (e.g., preference for a given device), or a combination of the foregoing. Further description as to determining a preference for the second device (or the first device, as the case may be) is provided in connection with FIG. 4.

If there is no preference for the second device, as determined at 304, the first device again may be the device that responds to the user's input, e.g., by playing a media file, etc., as illustrated at 305. However, if there is a preference for the second device, e.g., because it has a higher confidence in interpreting the user's input, the first device may defer to the second device in terms of responding or acting on the user input, even if the first device has received and properly interpreted the input, as illustrated at 306.

Figure 4:
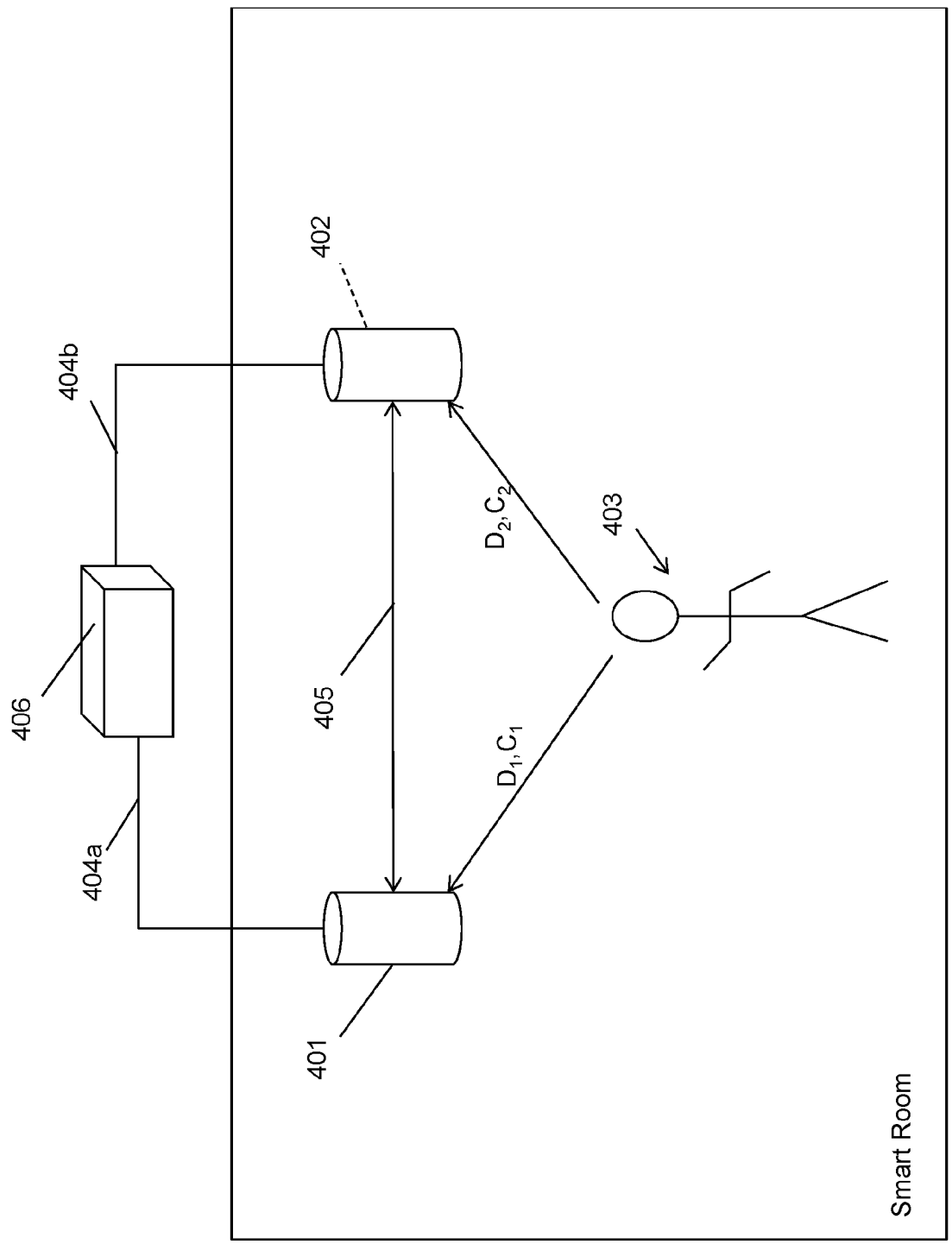
FIG. 4 illustrates an example use environment.

FIG. 4 illustrates an example use case environment. The following examples highlight some specific example functionality expanding on the general method outlined in FIG. 3.

As shown in FIG. 4, in a smart room (e.g., kitchen, living room, etc.) having more than one electronic device 401, 402 capable of receiving and acting on user inputs, a user 403 may issue a command such as a voice query "what's the weather in Seattle Wash.?" A first device 401 and a second device 402 might both hear the voice query, since the user 403 is standing near both devices 401, 402. If the first device 401 approximates the distance from user to be $D_1$ and the second device 402 approximates distance from the user as $D_2$, where $D_1 < D_2$, and the command is resolved with equal confidence, i.e., $C_1 = C_2$, both devices 401, 402 coordinate and the first device 401 issues the response based on distance.

As another example, a user 403 may issue a voice command "tell me a joke." The first device 401 and the second device 402 again both hear the voice command and are capable of responding. Device 401 might approximate that the user 403 is 10 feet away, $D_1$, and device 402 might approximate that the user 403 is 11 feet away, $D_2$. Thus, again $D_1 < D_2$. However, device 402 might resolve the voice command with a higher confidence than device 401, i.e., $C_1 < C_2$. In such a case, device 402 might respond to the voice command to tell a joke based on confidence level.

It will be noted that device 401 and device 402 are aware of each other's presence and/or capabilities, e.g., in terms of distance to the user, confidence in identifying the user's input, etc. This may be accomplished via a direct communication link 405 between the devices 401, 402 locally, e.g., using a BLUETOOTH connection or other wireless communication mechanism. Additionally or in the alternative, the devices 401, 402 might coordinate their capabilities in terms of communicating their distance to the user 403, their confidence in the identification of the user input, etc., via a remote service, e.g., via a connections 404a, 404b to a cloud device 406. For example, each device 401, 402 might report its capabilities in terms of distance and confidence in responding to the user input to the cloud device 406, where the cloud device 406 instructs the devices 401, 402 to respond or defer in a given context or provides the data necessary for each device to determine if it should respond.

As has been described herein, an embodiment facilitates coordination of communications between local devices such that the devices may make a single response to a user input that is capable of triggering more than one device to respond. This is achieved not by putting the burden on the user to accurately identify the device to which the command is directed, but rather by automated logic that permits the devices themselves to identify and resolve potential conflict situations.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a first device, a user input;
   determining, at the first device, a second device is capable of responding to the user input;
   resolving, using a processor, a target device from among the first device and the second device based upon a factor, associated with the user input, generated by each of the first device and the second device and shared between the first device and the second device, wherein the factor is based at least in part upon a degree of confidence associated with identification of the user input; and
   executing, using the target device, a command in response to the user input.

2. The method of claim 1, wherein the determining comprises receiving an indication of the second device from a remote device.

3. The method of claim 2, wherein the remote device is a cloud device.

4. The method of claim 1, wherein the determining comprises direct communication between the first device and the second device.

5. The method of claim 1, wherein the determining occurs prior to the receiving of the user input.

6. The method of claim 1, wherein the resolving comprises evaluating a confidence score of identifying the user input generated by one or more of the first device and the second device.

7. The method of claim 6, wherein the evaluating a confidence score occurs locally at one or more of the first device and the second device.

8. The method of claim 6, wherein the evaluating a confidence score occurs at a remote device.

9. The method of claim 1, wherein the resolving comprises:
   evaluating a distance between a user providing the user input and one or more of the first device and the second device; and
   selecting the target device based on the distance.

10. The method of claim 1, wherein the resolving comprises:
    evaluating a confidence score of identifying the user input generated by one or more of the first device and the second device;
    evaluating a distance between a user providing the user input and one or more of the first device and the second device; and
    selecting the target device based on one or more of the confidence score and the distance.

11. An electronic device, comprising:
    an input device;
    an output device;
    a processor; and
    a memory device that stores instructions executable by the processor to:
      receive, at the input device, a user input;
      determine a second device is capable of responding to the user input;
      resolve a target device from among the electronic device and the second device based upon a factor, associated with the user input, generated by each of the first device and the second device and shared between the first device and the second device, wherein the factor is based at least in part upon a degree of confidence associated with identification of the user input; and
      execute a command in response to the user input.

12. The electronic device of claim 11, wherein the instructions executed by the processor to determine comprise instructions that obtain an indication of the second device from a remote device.

13. The electronic device of claim 12, wherein the remote device is a cloud device.

14. The electronic device of claim 11, wherein the instructions executed by the processor to determine comprise instructions that provide direct communication between the electronic device and the second device.

15. The electronic device of claim 11, wherein the command in response to the user input comprises one or more of:
    a deferral to the second device; and
    an action provided using the output device.

16. The electronic device of claim 11, wherein the instructions that are executed by the process to resolve a target device comprise instructions that evaluate a confidence score of identifying the user input generated by one or more of the electronic device and the second device.

17. The electronic device of claim 16, wherein the instructions that evaluate a confidence score comprise instructions that resolve the target device locally at one or more of the electronic device and the second device.

18. The electronic device of claim 16, wherein the instructions that evaluate a confidence score comprise instructions that receive a confidence score from a remote device.

19. The electronic device of claim 11, wherein the instructions that are executed by the processor to resolve a target device comprises:
   instructions that evaluate a distance between a user providing the user input and one or more of the electronic device and the second device; and
   instructions that select the target device based on the distance.

20. A product, comprising:
   a storage device that stores code, the code being executable by a processor and comprising:
   code that receives, at a first device, a user input;
   code that determines, at the first device, a second device is capable of responding to the user input;
   code that resolves, using a processor, a target device from among the first device and the second device based upon a factor, associated with the user input, generated by each of the first device and the second device and shared between the first device and the second device, wherein the factor is based at least in part upon a degree of confidence associated with identification of the user input; and
   code that executes, using the target device, a command in response to the user input.

* * * * *